Nov. 1, 1960    R. RUBIN ET AL    2,958,722
ELECTRICAL INSULATED SPLICE
Filed Jan. 31, 1955

INVENTORS
Richard Rubin, Leon G. Wilde
BY
EZEKIEL WOLF
their Attorney

United States Patent Office 2,958,722
Patented Nov. 1, 1960

2,958,722
ELECTRICAL INSULATED SPLICE
Richard Rubin, Natick, and Leon G. Wilde, North Andover, Mass., assignors to Andrew Alford, Boston, Mass.

Filed Jan. 31, 1955, Ser. No. 484,950
4 Claims. (Cl. 174—84)

The present invention relates to a means and method of insulating the joint of two electrically insulated wires which are spliced together.

The problem of insulating spliced joints of electrical wires has usually been solved by wrapping the joint with a quantity of rubberized friction tape or by some similar improvised method which does not always prove satisfactory. It is, therefore, an object of the present invention to provide a means for insulating these spliced joints in such a manner that the spliced portion of the wires will be effectively insulated against all normal wear and weather conditions.

It is also an object of the present invention to provide a method of insulating splices of electric wires in such a manner that the insulation may be done with substantial efficiency and with the use of a minimum amount of material.

A further object of the present invention is to provide a method of insulating spliced segments of two insulated electrical wires or cables with a uniform procedure and with such simplicity it may normally be done correctly each time a pair of wires are spliced.

A still further object of the present invention is to provide a means of insulating the splice between two electric wires which insulation may readily be removed and used again on another spliced section.

These and other objects of the present invention will be more clearly understood when considered in connection with the accompanying drawings, in which.

Figure 1:
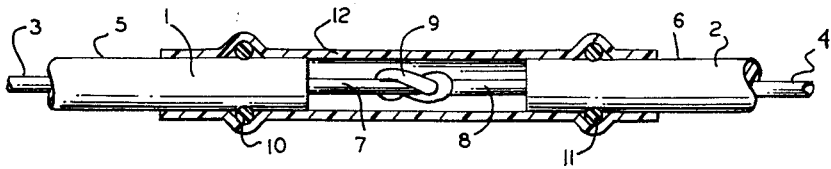
Figure 1 shows a side sectional elevation of the invention.

In this invention, the flexible electrical cables 1 and 2 are provided with core conductive wires 3 and 4, which are insulated respectively by the flexible insulating coverings 5 and 6. These wires 1 and 2 are spliced together at their exposed ends 7 and 8 respectively of the core wires 3 and 4 in the spliced joint 9. This spliced joint 9 may be formed by any of the accepted splicing methods. Near the inner ends of the insulated coverings 5 and 6 of the wires 1 and 2, respectively, are positioned O-rings 10 and 11 respectively. These O-rings have an inside diameter substantially equal to or preferably somewhat smaller than the diameter of the electric wires 1 and 2 and thereby form a tight fit about the insulating covering on each of these wires.

Positioned over the spliced section 9 and over the O-rings 10 and 11 and extending beyond them is a sleeve element 12, also of flexible waterproof and resilient material. This sleeve element 12 should have a diameter substantially equal to or slightly less than the diameter of the electric cables 1 and 2, so that it fits tightly about the insulated sections 5 and 6 of these wires and holds in contact by frictional engagement. The ends of this sleeve 12 extend over and beyond the O-rings 10 and 11 and also engage frictionally with the O-rings. The tension created by the O-rings on the sleeve 12 at their lines of contact should be such as to securely hold the sleeve 12 in position and thereby prevent it from sliding up and down the wire. It has been found that a rubber sleeve is preferable for this purpose as well as rubber O-rings. As illustrated in the drawings, the O-rings 10 and 11 should be sufficiently tight fitting as to actually bite into the insulation of the wire.

Figure 2:
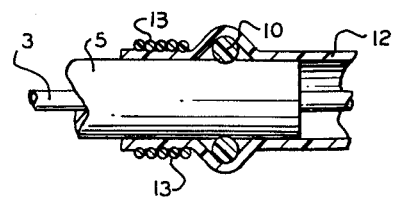
Figure 2 shows a modification of the invention as shown in Figure 1.

A modification of this invention is shown in Figure 2, in which the areas of the sleeve 12 which extend beyond the O-rings are firmly secured about the insulation of the wire by coiling tightly around this portion of the sleeve a thread 13, made of nylon, or other similar material. This winding should be tied at its ends or anchored in some similar manner so as to prevent it from unravelling and falling from the ends of the sleeve.

In addition to the advantages set forth above this invention provides not only a means for insulating spliced wires, but also a means for protecting the inside of the cable from moisture. Further, the above construction provides a means of insulating a wire in such a manner as to also withstand a certain amount of external hydrostatic pressure. For such purposes the nylon cords illustrated in Figure 2, may be positioned between the O-rings and the spliced section, rather than on the outside of the O-rings. Additionally, if desired, the rubber sleeve may be provided with an annular recess formed to receive the O-ring at each end of this sleeve. Each of the modifications described above may be used in connection with a multi-conductor and other types of cable as well as the specific type illustrated above.

Having now described our invention, we claim:

1. A method of connecting two insulated wires in an insulated joint comprising placing a pair of close fitting O-rings and a close fitting flexible sleeve on said wires, splicing said wires together at exposed ends, positioning an O-ring on each side of said splice and over the insulation of said wires, and positioning said sleeve over said splice with each end extending over and in frictional contact with one of said O-rings and in frictional contact with the insulation of said wires on either side of said O-ring.

2. A method of connecting two insulated wires in an insulated joint as set forth in claim 1, in which said sleeve is secured at its ends by tightly coiling threads about each end beyond the O-rings.

3. A means for insulating spliced electrical flexible insulated wires comprising O-rings of smaller inner diameter than said insulated wire, fitted over and biting into the flexible wire insulation on each side of said splice, and a flexible tight fitting sleeve coaxial with said wire and extending over and beyond said O-rings and frictionally engaging the same and the surface of said insulation on each side of said O-rings and in frictional contact with the insulation of said wires on either side of said O-ring.

4. A means for splicing flexible electrical insulated wires comprising O-rings of smaller inner diameters than said insulated wire, fitted over and biting into the flexible wire insulation on each side of said splice, and a flexible tight fitting sleeve of resilient material coaxial with said wire and extending over and beyond said O-rings, and frictionally engaging the O-rings at each end and the insulation of said wires on each side of said O-rings, and thread means coiled about the outer ends of said sleeve beyond the O-rings and securing it to said insulated wire and in frictional contact with the insulation of said wires on either side of said O-ring.

References Cited in the file of this patent

UNITED STATES PATENTS

| 362,872 | Brooks | May 10, 1887 |
| 743,346 | Swain | Nov. 3, 1903 |
| 2,264,815 | Thomson | Dec. 2, 1941 |

FOREIGN PATENTS

| 64,537 | Germany | Sept. 20, 1892 |